(12) United States Patent
Van Oost et al.

(10) Patent No.: US 9,088,949 B2
(45) Date of Patent: Jul. 21, 2015

(54) POWER SAVING METHOD AT AN ACCESS POINT

(75) Inventors: Koen Van Oost, Edegem (BE); Sylvain Dumet, Edegem (BE); Sabine Bulteel, Edegem (BE); Erik Horemans, Edegem (BE)

(73) Assignee: THOMSON LICENSING, Issy les Moulineaux (FR)

( * ) Notice: Subject to any disclaimer, the term of this patent is extended or adjusted under 35 U.S.C. 154(b) by 256 days.

(21) Appl. No.: 13/377,567

(22) PCT Filed: Jun. 8, 2010

(86) PCT No.: PCT/EP2010/058013
§ 371 (c)(1),
(2), (4) Date: Dec. 11, 2011

(87) PCT Pub. No.: WO2010/142681
PCT Pub. Date: Dec. 16, 2010

(65) Prior Publication Data
US 2012/0093053 A1     Apr. 19, 2012

(30) Foreign Application Priority Data

Jun. 11, 2009  (EP) .................................... 09447023
Jul. 24, 2009  (EP) .................................... 09447032

(51) Int. Cl.
| | |
|---|---|
| *G08C 17/00* | (2006.01) |
| *H04W 52/02* | (2009.01) |
| *H04W 84/04* | (2009.01) |
| *H04W 88/08* | (2009.01) |

(52) U.S. Cl.
CPC ...... *H04W 52/0229* (2013.01); *H04W 52/0206* (2013.01); *H04W 84/045* (2013.01); *H04W 88/08* (2013.01); *Y02B 60/50* (2013.01)

(58) Field of Classification Search
None
See application file for complete search history.

(56) References Cited

U.S. PATENT DOCUMENTS

| | | |
|---|---|---|
| 5,566,357 A | 10/1996 | Holcman |
| 8,233,456 B1 * | 7/2012 | Kopikare et al. ............. 370/332 |
| 2003/0144020 A1 | 7/2003 | Challa et al. |
| 2007/0082714 A1 | 4/2007 | Beach et al. |
| 2007/0104454 A1 * | 5/2007 | Kikuchi ......................... 386/68 |

(Continued)

FOREIGN PATENT DOCUMENTS

| | | |
|---|---|---|
| CN | 101305625 | 11/2008 |
| EP | 2056628 | 5/2009 |

(Continued)

OTHER PUBLICATIONS

Search Rept: Jul. 10, 2010.

(Continued)

*Primary Examiner* — Jung-Jen Liu
(74) *Attorney, Agent, or Firm* — Robert D. Shedd; Shabtay S. Henig

(57) ABSTRACT

The present invention concerns a method at a wireless access point comprising a wireless interface, the method comprising the steps of enabling the wireless interface during a first period of time, checking if a wireless station associates during that first period of time, if a wireless station has been associated, keeping the wireless interface enabled, while a wireless station is attempting to associate, enabling the wireless interface during an extending period of time and if no wireless station is associated or is trying to associate, disabling the wireless interface for a second period of time.

10 Claims, 3 Drawing Sheets

(56) References Cited

U.S. PATENT DOCUMENTS

| | | |
|---|---|---|
| 2007/0127425 A1 | 6/2007 | Keidar et al. |
| 2008/0063082 A1* | 3/2008 | Watanabe et al. ........ 375/240.23 |
| 2008/0089412 A1* | 4/2008 | Ugur et al. ............... 375/240.12 |
| 2008/0129559 A1* | 6/2008 | Choi et al. ....................... 341/67 |
| 2008/0225950 A1* | 9/2008 | Zhu .......................... 375/240.14 |
| 2009/0034443 A1 | 2/2009 | Walker et al. |
| 2009/0034615 A1 | 2/2009 | Yano |
| 2010/0002614 A1* | 1/2010 | Subrahmanya ............... 370/311 |
| 2010/0008277 A1* | 1/2010 | Kopikare et al. ............. 370/311 |
| 2010/0124931 A1* | 5/2010 | Eskicioglu et al. ........... 455/440 |
| 2011/0244792 A1* | 10/2011 | Park et al. ....................... 455/39 |
| 2014/0022973 A1* | 1/2014 | Kopikare et al. ............. 370/311 |

FOREIGN PATENT DOCUMENTS

| | | |
|---|---|---|
| IL | 115513 | 10/1995 |
| WO | WO9712475 | 4/1997 |
| WO | WO 2004/075583 | 9/2004 |
| WO | WO2007013934 | 2/2007 |
| WO | WO 2009/077893 | 6/2009 |

OTHER PUBLICATIONS

IEEE 802.11—2007 Standard for information Technology; Telecommunications and information exchange between systems—Local and metropolitan area networks—Specific requirements, pp. 1-1183; Nov. 1999.

* cited by examiner

POWER SAVING METHOD AT AN ACCESS POINT

This application claims the benefit, under 35 U.S.C. §365 of International Application PCT/EP2010/058013, filed Jun. 8, 2010, which was published in accordance with PCT Article 21(2) on Dec. 16, 2010 in English and which claims the benefit of European patent application No. 09447023.4, filed Jun. 11, 2009 and European patent application No. 09447032.5, filed Jul. 24, 2009.

FIELD OF THE INVENTION

The present invention relates generally to a power saving mechanism and in particular to a power saving mechanism in a wireless access point.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

A centralized wireless network comprises a wireless access point and a plurality of wireless stations or client devices. Such a centralized wireless network is for example defined in the IEEE 802.11 family of standards. The access point is adapted to manage association of devices to the wireless network. The normal operational state of a wireless access point is to be active, even if no client devices are associated. The access point periodically sends beacon control packets to inform any station devices on the wireless network features. Being always active, the access point permits the station devices to associate. In a residential environment, the access point is generally idle for a main part of the day; no stations are associated, and no traffic other than beacon transmission occurs on the wireless network.

The access point consumes energy to manage a wireless network that is not used.

SUMMARY OF THE INVENTION

The present invention attempts to remedy at least some of the concerns connected with the wireless access point in the prior art, by providing a power saving mechanism in the access point.

The present invention concerns a method at a wireless access point comprising a wireless interface, no wireless station being associated to said wireless access point, the method comprising the steps of enabling the wireless interface during a first period of time, checking if a wireless station associates during that first period of time, if a wireless station has been associated, keeping the wireless interface enabled, if a wireless station is attempting to associate, enabling the wireless interface during an extending period of time and if no wireless station is associated or is trying to associate, disabling the wireless interface for a second period of time.

The method according to the embodiment permits to disable the wireless interface of the access point, and to reduce the power dissipation of the access point. The wireless interface is regularly enabled during a first period of time. The first period of time is relatively short to optimize power saving. The duration is extensible if necessary. It is extended when an association is in process. This permits the access point to check that the association is successful or not. If successful the access point then enables the wireless interface. If not successful, the access point disables the wireless interface again.

According to an embodiment, the method comprises the steps of, at the end of the extended period of time, if the wireless station has associated during the extended period of time, keeping the wireless interface enabled, and if the wireless station has cancelled attempting association, disabling the wireless interface for a second period of time.

Another object of the invention is a wireless access point comprising a wireless interface, wireless Interface Enabling enabling means for enabling or disabling the wireless interface and power reduction means for enabling the wireless interface during a first period of time, checking if a wireless station associates during that first period of time, and, if a wireless station has been associated, keeping the wireless interface enabled, if a wireless station is attempting to associate, enabling the wireless interface during an extending period of time, and if no wireless station is associated or is trying to associate, disabling the wireless interface for a second period of time.

According to an embodiment, the wireless access point is compliant with the IEEE802.11 standards.

According to an embodiment, the wireless access point is a femtocell.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

BRIEF DESCRIPTION OF THE DRAWINGS

The invention will be better understood and illustrated by means of the following embodiment and execution examples, in no way limitative, with reference to the appended figures on which:

In FIG. 1, the represented blocks are purely functional entities, which do not necessarily correspond to physically separate entities. Namely, they could be developed in the form of hardware or software, or be implemented in one or several integrated circuits.

DETAILED DESCRIPTION OF PREFERRED EMBODIMENTS

It is to be understood that the figures and descriptions of the present invention have been simplified to illustrate elements that are relevant for a clear understanding of the present invention, while eliminating, for purposes of clarity, many other elements found in typical digital multimedia content delivery methods and systems. However, because such elements are well known in the art, a detailed discussion of such elements is not provided herein. The disclosure herein is directed to all such variations and modifications known to those skilled in the art.

Figure 1:
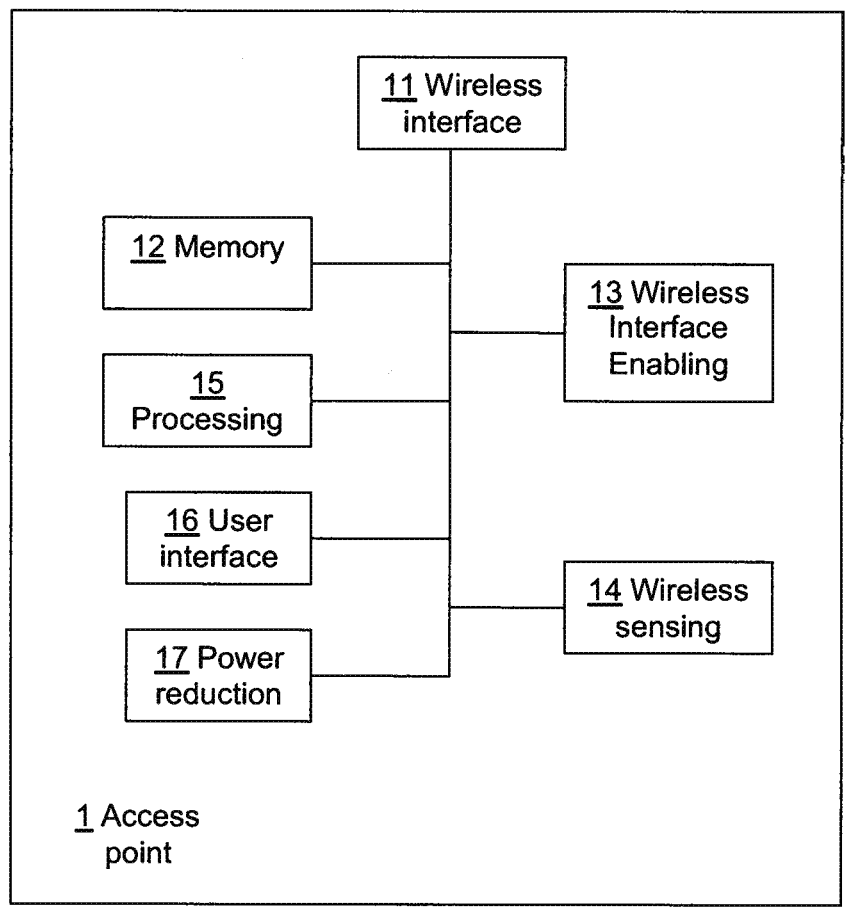
FIG. 1 is a block diagram of an object compliant with the embodiment.

The access point according to the embodiment is adapted to reduce its power consumption, based on optimizing the wireless interface use. The access point according to the embodiment is illustrated in FIG. 1. It comprises a wireless interface 11 compliant to the standard IEEE 802.11 access point wireless interface.

It comprises a wireless sensing module 14 that is adapted to check if a wireless station has associated with the access point. It also comprises a power reduction module 17 that is adapted to perform the power reduction algorithm according to the embodiment. It comprises a wireless interface enabling module 13 that is adapted to enable or disable the wireless interface in a manner as described hereinafter. According to the embodiment, the wireless interface is regularly enabled during a preconfigured period of time, with the flexibility to dynamically extend this time while association is detected.

The power reduction algorithm according to the embodiment is now defined. It is performed in the power reduction module. It requires four parameters stored in the memory 12.

The parameters are:
INTF ON time: the period of time that the access point needs to be enabled
INTF OFF time: the period of time that the access point can be disabled
INTF EXT time: the period with which the ON time needs to be extended
INTF Association/Connection event: a Boolean flag that signals the detection of STA/UE association/connection requests The INTF ON time and INTF OFF time are independent on any other timing requirements of the access point. For example, they are independent on the beacon period. However the INTF ON time might be long enough to enable the access point to send a beacon and the enable the stations to send association requests.

The parameters are set in the device. Of course, they can be modified locally using the user interface 16. They can also be modified using a remote management protocol such as defined in the TR69 standard, CPE WAN Management Protocol, version 1.1 of December 2007.

Figure 2:
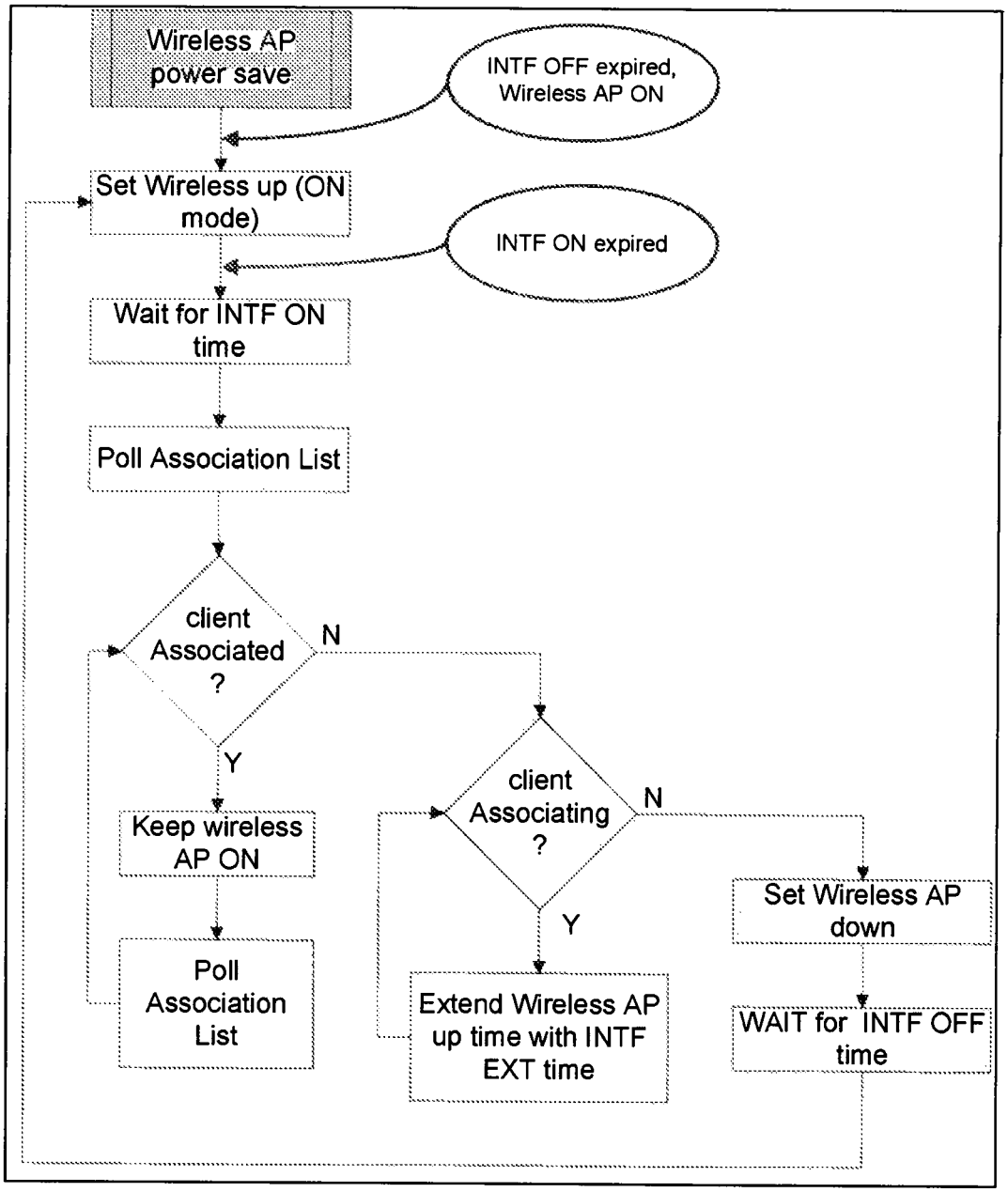
FIG. 2 is a flow chart of an algorithm compliant with the embodiment.

The power reduction algorithm illustrated in FIG. 2 is realized using these parameters.

When the access point boots, the wireless interface enabling module 13 enables the wireless interface for a preconfigured period (INTF ON time). When the wireless interface is enabled, the access point functions as specified in the IEEE 802.11 standards. According to the embodiment, during this period the wireless sensing module checks if there are stations that successfully associate with the access point. If necessary, it informs the power reduction module. The associated stations identifiers list is stored in the memory 12.

When the deadline of the ON period is reached, the power reduction module decides whether it should disable the wireless interface or keep it active. This decision is based on two criteria. Either there is a station that has successfully associated with the access point or a station is still attempting to associate with the access point.

In the first case, a station has successfully associated with the access point. The wireless interface is enabled. The power reduction module periodically reads the associated stations list stored in the memory. The wireless interface is kept active until no stations are populated in that list, i.e. until no stations are associated with the access point. When the power reduction module detects that no stations are associated any more, it makes the wireless interface enabling module disable the wireless interface.

In the second case a station is still attempting to associate with the access point. The power reduction module is notified of an event by the INTF association/connection event flag received from the wireless sensing module. It keeps the wireless interface enabled for a preconfigured period (INTF EXT time) until no association attempts are seen for at least one extension period.

After the power reduction module has determined that there are no associated stations or no stations that are trying to associate, it disables the wireless interface for a preconfigured period (INTF OFF time). After that period the wireless interface is again enabled as the power reduction algorithm restarts. It should be noted that, when disabled, the access point doesn't receive and transmit traffic.

Figure 3:
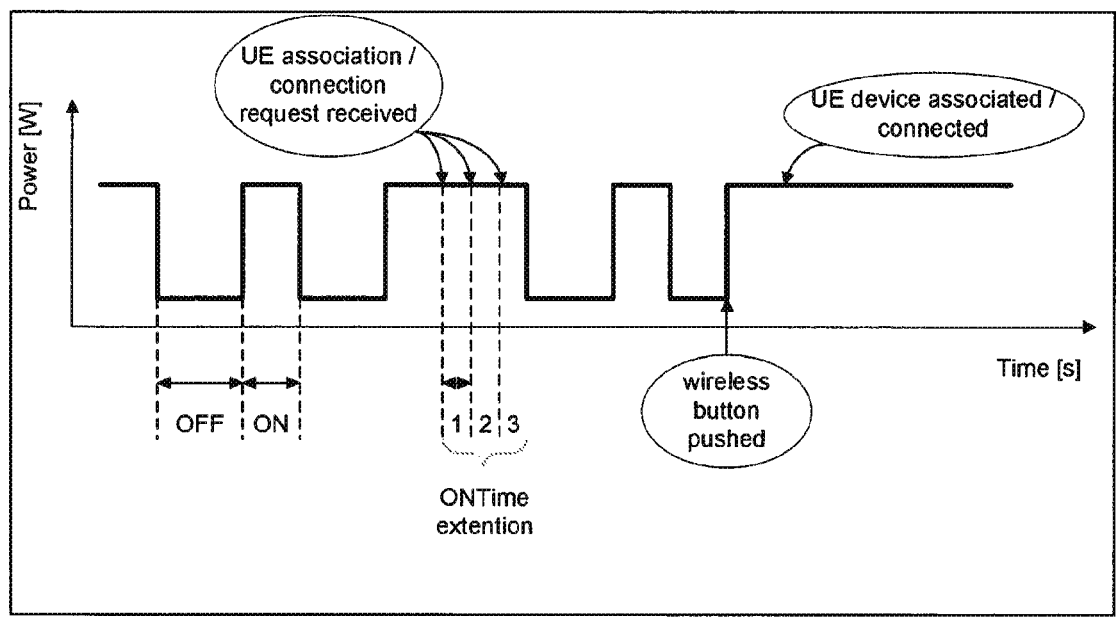
FIG. 3 is represents the power saving behavior of an access point compliant with the embodiment.

FIG. 3 illustrates the power saving behavior. When not used, the wireless interface toggles ON/OFF. If an association attempt is detected, the ON time is extended until either a successful association or until the station stops trying. When association is detected, the wireless interface is enabled until all stations disconnect.

The embodiment is based on a WLAN access point compliant to the IEEE802.11 standards family. Of course the invention applies to any access point device of a centralized wireless network. In particular, it applies to a wireless network that has capabilities to deliver an "association/connection request" packet.

In particular the invention applies to a femtocell, also called an access point base station or a Home Node B. A femtocell is a cellular base station that enables cellular devices to access a mobile network. The cellular devices (UE) are the wireless stations of the algorithm of the embodiment. The association is the registration process in the femtocell.

More generally, the On time extension is based on a predefined event on the wireless network. When the access point detects such an event, it keeps the wireless interface enabled for a preconfigured period.

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

The invention claimed is:

1. A method at a wireless access point comprising a wireless interface, said method comprising:
while no wireless station is associated to said wireless access point,
enabling the wireless interface during a first period of time;
if a wireless station has associated during said first period of time, keeping the wireless interface active;
if a wireless station is attempting to associate during said first period of time, enabling the wireless interface during an extended period of time; and
if no wireless station has associated or has attempted to associate during said first period of time, disabling the wireless interface for a second period of time so that when disabled the wireless interface does not transmit and receive, said second period of time being independent of any other timing requirements of the access point;

wherein, if said wireless station has associated during the extended period of time, keeping the wireless interface active at the end of said extended period of time, and if said wireless station has cancelled attempting association, disabling the wireless interface for said second period of time.

2. A method according to claim 1, said second period of time being independent of a beacon period.

3. A method according to claim 1, keeping the wireless interface active until no wireless station is associated to the access point.

4. A wireless access point comprising:
a wireless interface,
a wireless interface enabling module configured to enable or disable said wireless interface;
a power reduction module configured to enable the wireless interface during a first period of time, check if a wireless station associates during that first period of time, so that, if a wireless station has been associated during said first period of time, keeping the wireless interface active, if a wireless station is attempting to associate during said first period of time, enabling the wireless interface during an extended period of time, and if no wireless station has associated or has attempted to associate during said first period of time, disabling the wireless interface for a second period of time so that when disabled the wireless interface does not transmit and receive, said second period of time being independent of any other timing requirements of the access point, so that at the end of the second period of time the wireless interface is active during the first period of time, wherein said power reduction module is configured to, if said wireless station has associated during the extended period of time, keep the wireless interface active at the end of said extended period of time, and if said wireless station has cancelled attempting association, disable the wireless interface for said second period of time.

5. A wireless access point according to claim 4, said wireless access point being compliant with the IEEE802.11 standards.

6. A wireless access point according to claim 5, said second period of time being independent of a beacon period.

7. A wireless access point according to claim 4, said wireless access point being a femtocell.

8. A wireless access point according to claim 4, said power reduction module being configured to keep the wireless interface active until no wireless station is associated to the access point.

9. A method at a wireless access point device comprising a wireless interface, said wireless access point device being into a power reduction mode, said method comprising:
while no wireless station is associated to said wireless access point,
enabling the wireless interface during a first period of time;
if a wireless station has associated during said first period of time, keeping the wireless interface active and leaving the power reduction mode;
if a wireless station is attempting to associate during said first period of time, enabling the wireless interface during an extended period of time; and
if no wireless station has associated or has attempted to associate during said first period of time, disabling the wireless interface for a second period of time so that when disabled the wireless interface does not transmit and receive, said second period of time being independent of any other timing requirements of the access point
wherein, if said wireless station has associated during the extended period of time, keeping the wireless interface active at the end of said extended period of time, and if said wireless station has cancelled attempting association, disabling the wireless interface for said second period of time.

10. A method according to claim 9, on detection that no wireless stations are associated, entering the power reduction mode.

* * * * *